(12) United States Patent
Vail et al.

(10) Patent No.: US 8,734,552 B1
(45) Date of Patent: *May 27, 2014

(54) METHODS OF FABRICATING POLYCRYSTALLINE DIAMOND AND POLYCRYSTALLINE DIAMOND COMPACTS WITH A CARBONATE MATERIAL

(75) Inventors: Michael A. Vail, Genola, UT (US); Kenneth E. Bertagnolli, Riverton, UT (US)

(73) Assignee: US Synthetic Corporation, Orem, UT (US)

( * ) Notice: Subject to any disclaimer, the term of this patent is extended or adjusted under 35 U.S.C. 154(b) by 1331 days.

This patent is subject to a terminal disclaimer.

(21) Appl. No.: 12/185,457

(22) Filed: Aug. 4, 2008

Related U.S. Application Data

(63) Continuation-in-part of application No. 11/210,292, filed on Aug. 24, 2005, now Pat. No. 7,635,035.

(51) Int. Cl.
- *B24D 3/02* (2006.01)
- *C09C 1/68* (2006.01)
- *C09K 3/14* (2006.01)
- *C09G 1/02* (2006.01)
- *B01J 23/00* (2006.01)

(52) U.S. Cl.
CPC ............... *C09G 1/02* (2013.01); *B01J 23/002* (2013.01); *C09K 3/1409* (2013.01)
USPC ............................. 51/307; 562/552; 428/408

(58) Field of Classification Search
USPC .......................................................... 51/307
See application file for complete search history.

(56) References Cited

U.S. PATENT DOCUMENTS

| | | | |
|---|---|---|---|
| 3,745,623 A | | 7/1973 | Wentorf, Jr. et al. |
| 4,224,380 A | * | 9/1980 | Bovenkerk et al. ........... 428/545 |
| 4,268,276 A | | 5/1981 | Bovenkerk |
| 4,274,900 A | | 6/1981 | Mueller et al. |
| 4,311,490 A | | 1/1982 | Bovenkerk et al. |
| 4,333,986 A | | 6/1982 | Tsuji et al. |
| 4,410,054 A | | 10/1983 | Nagel et al. |
| 4,468,138 A | | 8/1984 | Nagel |
| 4,518,659 A | | 5/1985 | Gigl et al. |
| 4,525,179 A | | 6/1985 | Gigl |

(Continued)

OTHER PUBLICATIONS

Armin Kirfel et al., "Potassium lithium carbonate, KLiCO3: single-crystal X-ray structure analysis and thermal expansion", Zeitschrift fur Kristallographie: vol. 215, Issue 12, pp. 744 (2000).*

(Continued)

*Primary Examiner* — Kaj K Olsen
*Assistant Examiner* — Ross J Christie
(74) *Attorney, Agent, or Firm* — Dorsey & Whitney LLP

(57) ABSTRACT

Embodiments relate to polycrystalline diamond ("PCD"), polycrystalline diamond compacts ("PDCs") having a PCD table comprising such PCD, methods of fabricating such PCD and PDCs, and applications. In an embodiment, a method includes sintering diamond particles in the presence of a carbonate material to form PCD. The carbonate material includes at least one alkali metal carbonate. In an embodiment, PCD includes a plurality of bonded diamond grains defining a matrix. An interstitial constituent may be dispersed through the matrix. The interstitial constituent includes at least one alkali metal carbonate, at least one alkali metal oxide, or both. In an embodiment, a PDC includes a substrate bonded to a PCD table. The PCD table may be formed from any of the disclosed embodiments of PCD.

19 Claims, 10 Drawing Sheets

(56) References Cited

U.S. PATENT DOCUMENTS

| | | | |
|---|---|---|---|
| 4,556,403 A | 12/1985 | Almond et al. | |
| 4,560,014 A | 12/1985 | Geczy | |
| 4,572,722 A * | 2/1986 | Dyer | 51/309 |
| 4,604,106 A | 8/1986 | Hall et al. | |
| 4,629,373 A | 12/1986 | Hall | |
| 4,643,741 A * | 2/1987 | Yu et al. | 51/295 |
| 4,664,705 A | 5/1987 | Horton et al. | |
| 4,694,918 A | 9/1987 | Hall | |
| 4,738,322 A | 4/1988 | Hall et al. | |
| 4,738,689 A | 4/1988 | Gigl et al. | |
| 4,797,241 A * | 1/1989 | Peterson et al. | 264/122 |
| 4,798,026 A | 1/1989 | Cerceau | |
| 4,811,801 A | 3/1989 | Salesky et al. | |
| 4,871,377 A | 10/1989 | Frushour | |
| 4,874,398 A | 10/1989 | Ringwood | |
| 4,906,528 A | 3/1990 | Cerceau et al. | |
| 4,907,377 A | 3/1990 | Csillag et al. | |
| 4,913,247 A | 4/1990 | Jones | |
| 4,948,388 A | 8/1990 | Ringwood | |
| 4,985,051 A | 1/1991 | Ringwood | |
| 5,009,673 A | 4/1991 | Cho | |
| 5,011,509 A | 4/1991 | Frushour | |
| 5,011,514 A | 4/1991 | Cho et al. | |
| 5,016,718 A | 5/1991 | Tandberg | |
| 5,092,687 A | 3/1992 | Hall | |
| 5,120,327 A | 6/1992 | Dennis | |
| 5,127,923 A | 7/1992 | Bunting et al. | |
| 5,135,061 A | 8/1992 | Newton, Jr. | |
| 5,151,107 A | 9/1992 | Cho et al. | |
| 5,154,245 A | 10/1992 | Waldenstrom et al. | |
| 5,180,022 A | 1/1993 | Brady | |
| 5,266,236 A | 11/1993 | Bovenkerk | |
| 5,273,557 A | 12/1993 | Cerutti et al. | |
| 5,304,342 A | 4/1994 | Hall, Jr. et al. | |
| 5,351,772 A | 10/1994 | Smith | |
| 5,364,192 A | 11/1994 | Damm et al. | |
| 5,368,398 A | 11/1994 | Damm et al. | |
| 5,370,195 A | 12/1994 | Keshavan et al. | |
| 5,435,403 A | 7/1995 | Tibbitts | |
| 5,460,233 A | 10/1995 | Meany et al. | |
| 5,480,233 A | 1/1996 | Cunningham | |
| 5,544,713 A | 8/1996 | Dennis | |
| 5,590,729 A | 1/1997 | Cooley et al. | |
| 5,605,198 A | 2/1997 | Tibbitts et al. | |
| 5,624,756 A | 4/1997 | Ueda et al. | |
| 5,769,176 A | 6/1998 | Sumiya et al. | |
| 5,787,022 A | 7/1998 | Tibbitts et al. | |
| 5,912,217 A * | 6/1999 | Sumiya et al. | 51/307 |
| 5,950,747 A | 9/1999 | Tibbitts et al. | |
| 5,967,249 A | 10/1999 | Butcher | |
| 6,021,859 A | 2/2000 | Tibbitts et al. | |
| 6,068,913 A | 5/2000 | Cho et al. | |
| 6,245,312 B1 | 6/2001 | Blank et al. | |
| 6,248,447 B1 | 6/2001 | Griffin et al. | |
| 6,270,548 B1 * | 8/2001 | Campbell et al. | 75/243 |
| 6,315,065 B1 | 11/2001 | Yong et al. | |
| 6,344,149 B1 * | 2/2002 | Oles | 216/11 |
| 6,401,844 B1 | 6/2002 | Doster et al. | |
| 6,410,085 B1 | 6/2002 | Griffin et al. | |
| 6,435,058 B1 | 8/2002 | Matthias et al. | |
| 6,443,248 B2 | 9/2002 | Yong et al. | |
| 6,452,045 B1 * | 9/2002 | Brownscombe et al. | 562/481 |
| 6,481,511 B2 | 11/2002 | Matthias et al. | |
| 6,544,308 B2 | 4/2003 | Griffin et al. | |
| 6,562,462 B2 | 5/2003 | Griffin et al. | |
| 6,576,211 B1 * | 6/2003 | Davies et al. | 423/446 |
| 6,585,064 B2 | 7/2003 | Griffin et al. | |
| 6,589,640 B2 | 7/2003 | Griffin et al. | |
| 6,592,985 B2 | 7/2003 | Griffin et al. | |
| 6,601,662 B2 | 8/2003 | Matthias et al. | |
| 6,739,214 B2 | 5/2004 | Griffin et al. | |
| 6,749,033 B2 | 6/2004 | Griffin et al. | |
| 6,793,681 B1 | 9/2004 | Pope et al. | |
| 6,861,098 B2 | 3/2005 | Griffin et al. | |
| 6,861,137 B2 | 3/2005 | Griffin et al. | |
| 6,878,447 B2 | 4/2005 | Griffin et al. | |
| 6,913,633 B2 | 7/2005 | Fries et al. | |
| 7,261,753 B2 | 8/2007 | Yamamoto et al. | |
| 7,621,974 B2 | 11/2009 | Yamamoto et al. | |
| 7,628,234 B2 | 12/2009 | Middlemiss | |
| 7,635,035 B1 * | 12/2009 | Bertagnolli et al. | 51/307 |
| 7,918,293 B1 | 4/2011 | Vail | |
| 2004/0060243 A1 * | 4/2004 | Fries et al. | 51/307 |
| 2004/0062928 A1 * | 4/2004 | Raghavan et al. | 428/408 |
| 2004/0094333 A1 * | 5/2004 | Yamamoto et al. | 175/426 |
| 2005/0019114 A1 | 1/2005 | Sung | |
| 2005/0044800 A1 | 3/2005 | Hall et al. | |
| 2005/0076897 A1 | 4/2005 | Yoshida et al. | |
| 2007/0079994 A1 | 4/2007 | Middlemiss | |
| 2007/0187154 A1 | 8/2007 | Yamamoto et al. | |
| 2007/0187155 A1 | 8/2007 | Middlemiss | |
| 2007/0193782 A1 | 8/2007 | Fang et al. | |
| 2008/0011522 A1 | 1/2008 | Hall et al. | |
| 2008/0057145 A1 | 3/2008 | Hall et al. | |
| 2008/0085407 A1 | 4/2008 | Cooley et al. | |
| 2008/0099250 A1 | 5/2008 | Hall et al. | |
| 2008/0206576 A1 | 8/2008 | Qian et al. | |
| 2008/0223623 A1 | 9/2008 | Keshavan et al. | |
| 2008/0314647 A1 | 12/2008 | Hall et al. | |
| 2009/0260895 A1 * | 10/2009 | Vail et al. | 51/307 |
| 2010/0212971 A1 | 8/2010 | Mukhopadhyay | |

OTHER PUBLICATIONS

U.S. Appl. No. 12/495,986, filed Jul. 1, 2009, Bertagnolli, et al.

U.S. Appl. No. 12/614,330, filed Nov. 6, 2009, Bertagnolli, et al.

Minoru Akaishi, Shinobu Yamaoka, Fumihiro Ueda and Tadakazu Ohashi, "Synthesis of polycrystalline diamond compact with magnesium carbonate and its physical properties", Diamond and Related Materials 5 (1996) pp. 2-7.

Minoru Akaishi and Shinobu Yamaoka, "Physical and chemical properties of the heat resistant diamond compacts from diamond-magnesium carbonate system", Materials Science and Engineering A209 (1996) pp. 54-59.

H.P. Bovenkerk, F.P. Bundy, R.M. Chrenko, P.J. Codella, H.M. Strong and R.H. Wentorf Jr., "Errors in diamond synthesis", Nature, vol. 365, Sep. 2, 1993 p. 19.

V.A. Davydov, A.V. Rakhmanina, V. Agafonov, B. Narymbetov, J.-P. Boudou and H. Szwarc, "Conversion of polycyclic aromatic hydrocarbons to graphite and diamond at high pressures", Carbon 42 (2004) pp. 261-269.

S.M. Hong, M. Akaishi and S. Yamaoka, "Nucleation of diamond in the system of carbon and water under very high pressure and temperature", Journal of Crystal Growth 200 (1999) pp. 326-328.

Litvin, Y.A. 2003. Alkaline-chloride components in processes of diamond growth in the mantle and high-pressure experimental conditions. Doklady Earth Science 389 (3), 338-391.

K. Sato and T. Katsura, "Sulfur: a new solvent-catalyst for diamond synthesis under high-pressure and high temperature conditions", Journal of Crystal Growth 223 (2001) pp. 189-194.

A.V. Shushkanova and Yu. A. Litvin, "Formation of diamond polycrystals in pyrrhotite-Carbonic Melt: Experiments at 6.7 Gpa", ISSN 1028-334X, Doklady Earth Sciences, 2006, vol. 409A, No. 6, pp. 916-920.

Shushkanova, A.V., Litvin, Yu. A. (2008). Diamond formation in sulfide pyrrhotite-carbon melts: experiments at 6.0-7.1 GPa and application to natural conditions. Geochemistry International, 46, 1, 37-47.

S.K. Singhal and H. Kanda, "Temperature dependence of growth of diamond from a Cu-C system under high pressure", Journal of Crystal Growth 154 (1995) pp. 297-302.

Nakamichi Yamasaki, Kazunori Yokosawa, Sergly Korablov and Kazuyuki Tohjt, "Synthesis of diamond particles under alkaline hydrothermal conditions", Solid State Phenomena vol. 114 (Jul. 2006) pp. 271-276.

Yanbin Wang, Ivan G. Getting, Donald J. Weidner and Michael T. Vaughan, "Performance of Tapered Anvils in a DIA-Type, Cubic-Anvil, High-Pressure Apparatus for X Ray Diffraction Studies", Properties of Earth and Planetary Materials at High Pressure and Temperature Geophysical Monograph 101, 1998 pp. 35-39.

(56) References Cited

OTHER PUBLICATIONS

Y. Wang and H. Kanda, "Growth of HPHT diamonds in alkali halides: possible effects of oxygen contamination", Diamond and Related Materials 7 (1998) pp. 57-63.
U.S. Appl. No. 11/210,292, Dec. 2, 2009, Issue Notification.
U.S. Appl. No. 11/210,292, Oct. 16, 2009, Notice of Allowance.
U.S. Appl. No. 11/210,292, Jun. 8, 2009, Notice of Allowance.
U.S. Appl. No. 11/210,292, Dec. 8, 2008, Office Action.
U.S. Appl. No. 11/210,292, Jul. 28, 2008, Notice of Allowance.
U.S. Appl. No. 11/210,292, Nov. 5, 2007, Office Action.
U.S. Appl. No. 11/210,292, Aug. 1, 2007, Office Action.
U.S. Appl. No. 12/614,330, Jan. 25, 2011, Notice of Allowance.
J.E. Westraadt, N. Dubrovinskaia, J.H. Neethling and I. Sigalas, Thermally stable polycrystalline diamond sintered with calcium carbonate. Science Direct. Diamond & Related Materials 16 (2007) pp. 1929-1935.
C. Sun, H. Xie, W. Zhang, H. Yee and P. Hing, Preferential Oxidation of Diamond, J. Phys. D: Appl. Phys. 33 (2000) pp. 2196-2199.
S.N. Nazarchuck, et al. The Diamond-Tungsten Carbide Polycrystalline Composite Material. ISSN 1063-4576, Journal of Superhard Materials, 2011, vol. 33, No. 1, pp. 1-12.
H.T. Hall, Sintered Diamonds, Science vol. 169, Aug. 28, 1970, 2 pages.
D.E. Scott, The History and Impact of Synthetic Diamond Cutters and Diamond Enhanced Inserts on the Oil and Gast Industry. Industrial Diamond Review Jan. 2006, 11 pages.
M.V. Sneddon, Polycrystalline Diamond: Manufacture, Wear Mechanisms, and Implications for Bit Design. Journal of Petroleum Technology, Dec. 1988, pp. 1593-1601.
R. H. Wentforf, Sintered Superhard Materials. Science, New Seriers, vol. 208, No. 4446, Advanced Technology. (May 23, 1980) pp. 872-880.
Bex, The Influence of Temperature and Heating Time on PCD Performance. Industrial Diamond Review, 1984, vol. 44, 4 pages.
I.E. Clark, The Use of PCD for Petroleum and Mining Drilling. Industrial Diamond Review Jan. 1999, 6 pages.
Lammer, Mechanical Properties of Polycrystalline Diamonds. Materials Science and Technology, Nov. 1988, vol. 4, 7pages.
Z.J. Lin, Superhard Diamond/Tungsten Carbide Nanocomposites. Applied Physics Letters, 98, 121914 (2011), 3 pages.
J. Qian, High-Pressure, High-Temperature Sintering of Diamond-SiC Composites by Ball-Milled Diamond-Si Mixtures. J. Mater. Res., vol. 17, No. 8, Aug. 2002, pp. 2153-2160.
U.S. Appl. No. 12/495,986, May 10, 2011, Office Action.
U.S. Appl. No. 13/093,572, Jun. 9, 2011, Office Action.
U.S. Appl. No. 13/284,713, filed Oct. 28, 2011, Bertagnolli, et al.
U.S. Appl. No. 12/614,330, May 11, 2011, Issue Notification.
U.S. Appl. No. 12/495,986, Dec. 13, 2011, Office Action.
U.S. Appl. No. 13/093,572, Sep. 22, 2011, Notice of Allowance.
U.S. Appl. No. 13/093,572, Nov. 2, 2011, Issue Notification.
U.S. Appl. No. 13/284,713, Jan. 26, 2012, Office Action.
U.S. Appl. No. 13/284,713, May 9, 2012, Office Action.
U.S. Appl. No. 13/284,713, Aug. 29, 2012, Notice of Allowance.
U.S. Appl. No. 13/284,713, Dec. 12, 2012, Issue Notification.
U.S. Appl. No. 13/093,572, filed Apr. 24, 2011, Bertagnolli, et al.
Lin, Jerry Y.S. (2003); "Novel Inorganic Membranes for High Temperature Carbon Dioxide Separation"; Final Technical Report; University of Cincinnati, Department of Chemical Engineering; 1-9.
Vail et al.; U.S. Appl. No. 12/120,849, filed May 15, 2008.
Sani; U.S. Appl. No. 11/983,619, filed Nov. 9, 2007.
Minoru Akaishi, Hisao Kanda and Shinobu Yamaoka, "Synthesis of Diamond From Graphite-Carbonate Systems Under Very High Temperature and Pressure", Journal of Crystal Growth 104 (1990), pp. 578-581.
Minoru Akaishi, et al., "Phosphorus: An Elemental Catalyst for Diamond Synthesis and Growth", Science AAAS 259, 1592 (1993).
Drs. F.P. Bundy, H.T. Hall, H.M. Strong and R.H. Wentorf, "Man-Made Diamond", Nature, vol. 176. p. 51, Jul. 9, 1955.
Drs. H.P. Bovenkerk, F.P. Bundy, H., T. Hall, H.M. Strong and R.H. Wentorf, "Preparation of Diamond", Nature, vol. 184, pp. 1094-1098, Oct. 10, 1959.
E.A. Ekimov, S. Gierlotka, I.P. Zibrov, E.L. Gromnitskaya and A. Presz, "Sintering of Diamond in the Presence of WO3", Inorganic Materials, vol. 40, No. 6, 2004, pp. 595-599.
E.A. Ekimov, V.A. Sidorov, N.N. Mel'Nik, S. Gierlotka, A. Presz, "Synthesis of Polycrystalline Diamond in the Boron Carbide-Graphite and Boron-Graphite Systems Under High Pressure and Temperature", Journal of Materials Science 39 (2004) pp. 4957-4960.
Shi-Ming Hong, Minoru Akaishi, and Shinobu Tamaoka, "High-Pressure Synthesis of Heat-Resistant Diamond Composite Using a Diamond-TiC0.6 Powder Mixture", Journal of the American Ceramic Society, vol. 82, No. 9 pp. 2497-2501 (1999).
Hisao Kanda, Minoru Akaishi and Shinobu Yamaoka, "New Catalysts for Diamond Growth Under High Pressure and High Temperature", Appl. Phys. Lett. 65 (6), pp. 784-786, Aug. 8, 1994.
Emma Tomlinson, Adrian Jones and Judith Milledge, "High-Pressure Experimental Growth of Diamond Using C-K2CO3-KCl as an Analogue for C1-Bearing Carbonate Fluid", Lithos 77 (2004) pp. 287-294.
Masao Wakatsuki, "New Catalysts for Synthesis of Diamond", Japan J. Appl. Phys. 5 (1966) p. 337.
Minoru Akaishi, Hisao Kanda and Shinobu Yamaoka, "High Pressure Synthesis of Diamond in the Systems of Graphite-Sulfate and Graphite-Hydroxide", Japanese Journal of Applied Physics, vol. 29, No. 7, Jul. 1990, pp. L. 1172-L. 1174.
A. Ya. Vul', V.M. Davidenko, S.V. Kidalov, S.S. Ordan'Yan, and V.A. Yashin, "Fullerenes Catalyze the Graphite-Diamond Phase Transition", Technical Physics Letters, vol. 27, No. 5, 2001, pp. 384-386.
H. Sumiya and S. Satoh, "Synthesis of Polycrystalline Diamond with New Non-Metallic Catalyst Under High Pressure and High Temperature", International Journal of Refractory Metals & Hard Materials 17 (1999) pp. 345-350.
Bertagnolli et al., U.S. Appl. No. 11/210,292, "Polycrystalline Diamond Compact (PDC) Cutting Element Having Multiple Catalytic Elements".

* cited by examiner

METHODS OF FABRICATING POLYCRYSTALLINE DIAMOND AND POLYCRYSTALLINE DIAMOND COMPACTS WITH A CARBONATE MATERIAL

CROSS-REFERENCE TO RELATED APPLICATIONS

This application is a continuation-in-part of U.S. patent application Ser. No. 11/210,292 (now U.S. Pat. No. 7,635,035) entitled POLYCRYSTALLINE DIAMOND COMPACT (PDC) CUTTING ELEMENT HAVING MULTIPLE CATALYTIC ELEMENTS, naming Michael A. Vail and Kenneth E. Bertagnolli as inventors, filed on Aug. 24, 2005.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer (also known as a diamond table). The diamond table is formed and bonded to a substrate using an ultra-high pressure, ultra-high temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container or cartridge with a volume of diamond particles positioned on a surface of the cemented-carbide substrate. A number of such cartridges may be loaded into a HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst, such as cobalt, nickel, iron, or alloys thereof that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded diamond grains. Often, a solvent catalyst may be mixed with the diamond particles prior to subjecting the diamond particles and substrate to the HPHT process.

The solvent catalyst dissolves carbon from the diamond particles or portions of the diamond particles that graphitize due to the high temperature being used in the HPHT process. The solubility of the stable diamond phase in the solvent catalyst is lower than that of the metastable graphite under HPHT conditions. The undersaturated graphite tends to dissolve into the solvent catalyst and the supersaturated diamond tends to deposit or grow between existing diamond particles to form diamond-to-diamond bonds. Accordingly, diamond grains become mutually bonded to form a matrix of PCD with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, thus, degrading the mechanical properties of the PDC.

One conventional approach for improving the thermal stability of PDCs is to at least partially remove the solvent catalyst from the PCD table of the PDC by acid leaching. However, removing the solvent catalyst from the PCD table can be relatively time consuming for high-volume manufacturing.

Another conventional approach is to use a carbonate material, such as magnesium carbonate, as a catalyst to promote bonding of diamond particles and form PCD. For example, U.S. Pat. Nos. 5,624,756 and 7,261,753 disclose PCD materials sintered in the presence of a carbonate material. While such PCD materials may have enhanced thermal stability, employing a carbonate material as a catalyst may present processing challenges that are not typically experienced when using a metal-solvent catalyst, such as cobalt.

Therefore, manufacturers and users of PCD continue to seek improved thermally-stable PCD materials and processing techniques.

SUMMARY

Embodiments of the invention relate to PCD sintered in the presence of a carbonate material including at least one alkali metal carbonate, PDCs having a PCD table comprising such PCD, and methods of fabricating such PCD and PDCs. In an embodiment, a method includes sintering diamond particles in the presence of a carbonate material to form PCD. The carbonate material includes at least one alkali metal carbonate.

In another embodiment, PCD includes a plurality of bonded diamond grains defining a matrix. An interstitial constituent may be dispersed through the matrix. The interstitial constituent includes at least one alkali metal carbonate, at least one alkali metal oxide, or both.

In yet another embodiment, a PDC includes a substrate bonded to a PCD table. The PCD table may be formed from any of the disclosed embodiments of PCD.

In a further embodiment, a method of forming a PDC includes providing an at least partially leached PCD table including a plurality of interstitial regions. The method further includes infiltrating at least a portion of the interstitial regions of the at least partially leached polycrystalline diamond table with a carbonate material.

In yet a further embodiment, a PDC includes a substrate and a pre-sintered PCD table bonded to the substrate. The pre-sintered PCD table includes a plurality of bonded diamond grains defining a plurality of interstitial regions. At least a portion of the interstitial regions may be occupied by an interstitial constituent that includes at least one alkali metal carbonate, at least one alkali metal oxide, or both.

Other embodiments relate to applications utilizing the disclosed PDCs and PCD in various articles and apparatuses, such as rotary drill bits, bearing apparatuses, wire-drawing dies, machining equipment, and other articles and apparatuses.

In yet a further embodiment, diamond grit may be formed by subjecting graphite particles to heat and pressure in the presence of a carbonate material including at least one alkali metal carbonate and at least one melting point depressant. At least a portion of the graphite particles may be converted to diamond particles while being subjected to the heat and pressure.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PCD sintered in the presence of a carbonate material including at least one alkali metal carbonate, PDCs having a PCD table comprising such PCD, and methods of fabricating such PCD and PDCs. The embodiments of PDCs and PCD disclosed herein may be used in a variety of applications, such as rotary drill bits, bearing apparatuses, wire-drawing dies, machining equipment, and other articles and apparatuses.

Figure 1:
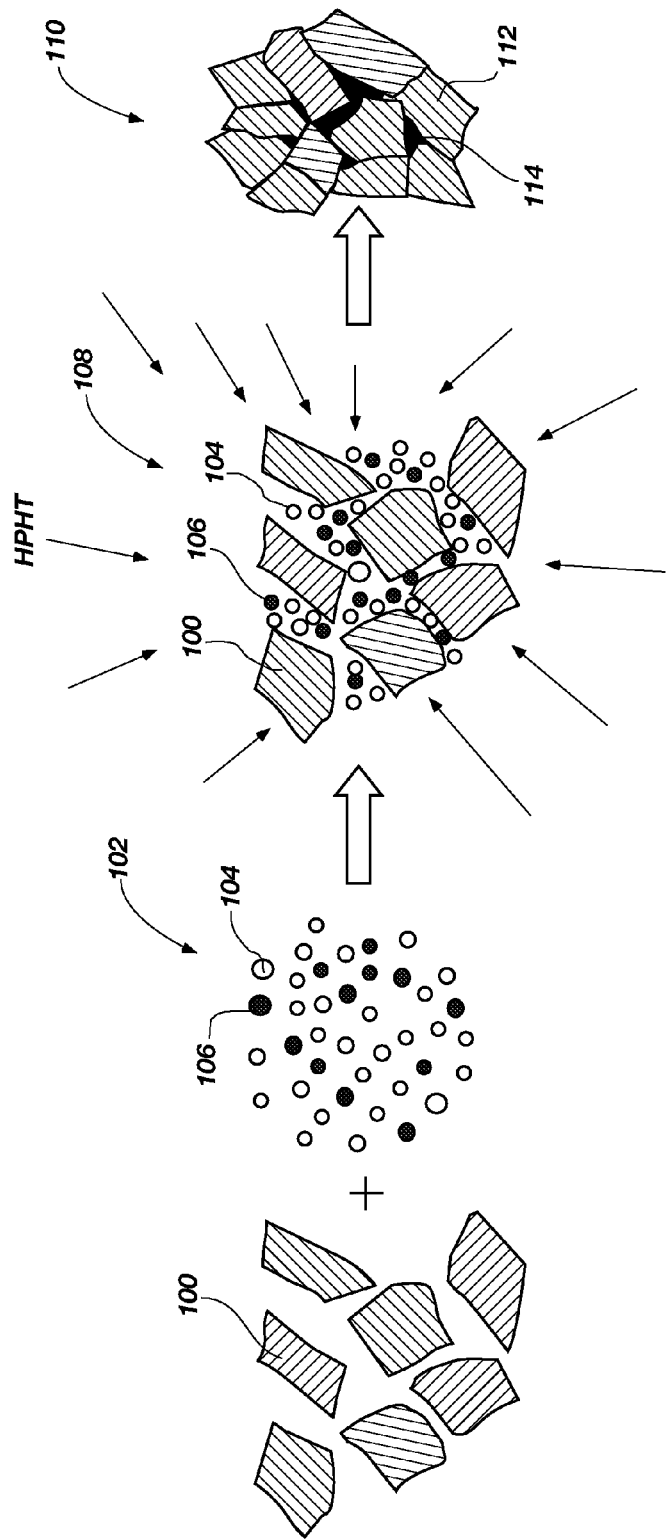
FIG. 1 is a schematic illustration of an embodiment of a method for fabricating PCD by sintering diamond particles in the presence of a carbonate material including at least one alkali metal carbonate and at least one melting point depressant.

FIG. 1 is a schematic illustration of an embodiment of a method for fabricating PCD by sintering diamond particles in the presence of a carbonate material that includes at least one alkali metal carbonate. A plurality of diamond particles 100 and a carbonate material 102 that promotes the growth between diamond particles 100 during HPHT processing may be provided. The diamond particles 100 may exhibit any suitable particle size for a particular application. However, a representative average particle size for the diamond particles 100 is about 0.5 µm to about 25 µm, with the diamond particles 100 exhibiting a single modal or at least a bi-modal particle size distribution.

The carbonate material 102 may include at least one alkali metal carbonate particles 104 (e.g., a carbonate of Li, Na, K, Rb, or Cs) capable of promoting the growth of diamond and at least one melting point depressant 106 that may be in the form of particles and selected to lower a temperature at which a composition of the at least one alkali metal carbonate particles 104 and the at least one melting point depressant 106 begin to melt during HPHT processing. As used herein, "a melting point depressant" is a component in a binary or greater chemical system that results in melting starting at a temperature lower than would occur without the melting point depressant. The at least one melting point depressant 106 may or may not be catalytic relative to diamond depending upon its chemistry. Although in the illustrated embodiment, the carbonate material 102 includes at least one melting point depressant 106, in some embodiments, the at least one melting point depressant may be absent.

It is noted that the carbonate material 102 may include constituents, such as an organic binder or other constituents. In another embodiment, a carbonate material may be provided that comprises a plurality of particles, with each particle comprising at least one alkali metal carbonate and at least one melting point depressant. Additionally, if desired, the carbonate material 102 may include one or more Group II alkaline earth metal carbonates (e.g., one or more carbonates of Be, Mg, Ca, Sr, or Ba).

The at least one alkali metal carbonate particles 104 may comprise a first alkali metal carbonate and the at least one melting point depressant 106 may comprise at least a second alkali metal carbonate (e.g., in the form of particles). The first and at least a second alkali metal carbonate may promote bonding between the diamond particles 100 during HPHT processing. According to one embodiment, the first alkali metal carbonate and the at least a second alkali metal carbonate may be present in selected proportions at or near of a eutectic composition for the chemical system defined by the first and at least a alkali metal carbonates. In an embodiment, the first alkali metal carbonate may be selected from a Group I carbonate (e.g., a carbonate of Li, Na, K, Rb, or Cs) and the at least one melting point depressant may be selected from one or more Group I carbonates that are different than that of the first alkali metal carbonate and the chemical system formed by the first alkali metal carbonate and the at least one melting point depressant partially or completely melts at a lower temperature than would occur if the at least one melting point depressant was not present. For example, the first alkali metal carbonate and the at least a second alkali metal carbonate may form a binary or greater chemical system that exhibits a eutectic point, and the first alkali metal carbonate and the at least a second alkali metal carbonate may form a eutectic or near eutectic composition.

According to one embodiment, the at least one alkali metal carbonate particles 104 may comprise lithium carbonate and the at least one melting point depressant 106 may comprise sodium carbonate and potassium carbonate. In an embodiment, the lithium carbonate, sodium carbonate, and potassium carbonate may be present in selected proportions at or near a ternary eutectic composition (e.g., a eutectic composition, a hypereutectic composition, or a hypoeutectic composition) for the lithium carbonate-sodium carbonate-potassium carbonate chemical system. In the lithium carbonate-sodium carbonate-potassium carbonate chemical system, the ternary eutectic composition occurs when the lithium carbonate is present in an amount of about 43.5 atomic percent, the sodium carbonate is present in an amount of about 31.5 atomic percent, and the potassium carbonate is present in an amount about 25 atomic percent and the ternary eutectic temperature is about 397° Celsius at approximately 1 atmosphere and about 1100° Celsius to about 1300° Celsius at approximately 77 kilobar.

In some embodiments, the at least one melting point depressant may comprise one or more different organic carbonates, such as polypropylene carbonate that has a melting temperature of −55° Celsius at room temperature. In other embodiments, the at least one melting point depressant 106 may comprise a non-catalytic material that does not substantially promote growth between the diamond particles 100 during HPHT processing. For example, the at least one melting point depressant 106 may comprise aluminum, gallium, or alloys of the preceding metals.

Still referring to FIG. 1, the diamond particles 100 and the carbonate material 102 may be mixed to form a mixture 108 by any suitable mixing process, such as a milling process. For example, the mixture 108 may be formed by mixing the diamond particles 100 and the carbonate material 102 in an attritor mill, a ball mill, or by another suitable mixing technique.

The mixture 108 may be subjected to a HPHT process to partially or completely melt the carbonate material 102 and sinter the diamond particles 100 to form PCD 110 (i.e., having bonded diamond grains 112). The carbonate material 102 may promote diamond growth between adjacent diamond particles 100. The carbonate material 102 may provide a source of carbon so that the existing diamond particles 100 may form a matrix of bonded diamond grains 112 (i.e., polycrystalline diamond).

In order to efficiently HPHT process the mixture 108, the mixture 108 may be placed in a pressure transmitting medium, such as a refractory metal can, graphite structure, pyrophyllite and/or other pressure transmitting structure. The pressure transmitting medium, including the mixture 108, may be subjected to a HPHT process using an ultra-high pressure press at a temperature sufficient to partially or completely melt the carbonate material 102 and at a corresponding pressure so that the diamond phase is thermodynamically stable. The HPHT process is performed for a time sufficient to partially or completely melt the carbonate material 102 and sinter the diamond particles 100 to form the PCD 110. Generally, the temperature may be at least sufficient to melt the carbonate material 102, such as a temperature of at least about 800° Celsius and a pressure of at least about 50 kilobar. For example, the temperature may be about 800° Celsius to about 2250° Celsius and a pressure of about 35 kilobar to about 100 kilobar (e.g., about 1100° Celsius to about 1300° Celsius and a pressure of about 70 kilobar to about 80 kilobar).

According to an embodiment, employing the carbonate material 102 including at least one alkali metal carbonate enables forming PCD at temperature and pressure conditions comparable to temperature and pressure conditions used to form PCD using cobalt or other metal-solvent catalysts to promote diamond growth and using conventional ultra-high pressure presses, such as a temperature below about 2250° Celsius and a pressure below about 80 kilobar. For example, the temperature of the HPHT process may be selected to be at or near a eutectic temperature of the carbonate material 102. However, as desired or needed, in other embodiments, the temperature may be above about 1700° Celsius (e.g., about 1800° Celsius to about 2250° Celsius) and the pressure may be above about 80 kilobar (e.g., about 80 kilobar to about 90 kilobar).

Still referring to FIG. 1, the PCD 110 includes a matrix defined by the bonded diamond grains 112 forming interstitial regions (not labeled) having an interstitial constituent 114 disposed therein. The interstitial constituent 114 dispersed throughout the matrix of the diamond grains 112 may comprise a sintering by-product, un-converted metal carbonates from the carbonate material 102, or combinations of the foregoing. A sintering by-product may comprise one or more alkali metal oxides as a result of converting at least a portion the carbonate material 102 (e.g., the alkali metal carbonate particles 104, at least one melting point depressant 106, or both), a non-stoichiometric alkali metal carbonate, or mixtures of the foregoing. For example, some of the carbon of the alkali metal carbonates in the carbonate material 102 may lose some carbon to form a non-stoichiometric alkali metal carbonate having a chemical formula $M_n C_y O_3$; where n=2, y is greater than zero and less than 1, and M is a Group I alkali metal. As another example, a sintering by-product may comprise an alkali metal oxide having the same alkali metal as the precursor alkali metal carbonate. A sintering by-product of, for example, lithium carbonate may comprise lithium oxide (e.g., $Li_2O$), a sintering by-product of sodium carbonate may comprise sodium oxide (e.g., $Na_2O$), and a sintering by-product of potassium carbonate may comprise potassium oxide (e.g., $K_2O$).

In some embodiments, only some of the alkali metal carbonates of the carbonate material 102 may be converted so that the PCD 110 so-formed includes un-converted alkali metal carbonates in addition to the sintering by-products (e.g., alkali metal oxides, non-stoichiometric alkali metal carbonates, or both). For example, when the carbonate material 102 includes a first alkali metal carbonate and one or more different alkali metal carbonates that function as a melting point depressant, the PCD 110 may include un-converted amounts of the first alkali metal carbonate and un-converted amounts of the one or more different alkali metal carbonates. In other embodiments, substantially all of the one or more alkali metal carbonates of the carbonate material 102 may be converted to corresponding one or more alkali metal oxides.

In an embodiment, when un-converted alkali metal carbonates, non-stoichiometric alkali metal carbonates, or both are present in the PCD 110, the PCD 110 may be heat treated or otherwise chemically reacted (e.g., under at least a partial vacuum) and at a temperature sufficient to convert substantially all of the remaining alkali metal carbonates to corresponding alkali metal oxides. For example, the PCD 110 may be heated at a temperature of about 1000° Celsius to about 1400° Celsius (e.g., under at least a partial vacuum) to effect conversion of any remaining alkali metal carbonates. Substantial conversion of the remaining alkali metal carbonates to alkali metal oxides may be of interest when further processing is to be performed on the PCD 110, such as bonding a substrate to the PCD 110 and/or high-temperature brazing the substrate to a drill bit, because such processing may melt the relatively low-melting point alkali metal carbonates of the PCD 110.

The PCD 110 may be more thermally stable than PCD sintered using a metal-solvent catalyst, such as cobalt, because the carbonate material 102 is not a solvent-type catalyst (e.g., cobalt, iron, nickel, or alloys thereof) and, therefore, any un-converted alkali metal carbonates and sintering by-products may not detrimentally promote back conversion of the diamond grains 112 to graphite and/or a gaseous by-product at elevated temperatures. Furthermore, the coefficient of thermal expansion of the one or more un-converted alkali metal carbonates and/or sintering by-products more closely matches (in comparison to cobalt or alloys thereof) the coefficient of thermal expansion of the diamond grains 112 to reduce thermally induced stresses during drilling operations and, therefore, also may help improve thermal stability.

Although the PCD embodiments disclosed herein are described as being formed by sintering diamond particles in the presence of a carbonate material, in other embodiments, the diamond particles may be replaced by graphite particles. In another embodiment, a relatively small amount of graphite particles (e.g., about 0.1 to about 10 weight percent) may be mixed with the diamond particles and subjected to an HPHT process in the presence of a carbonate material.

Figure 2:
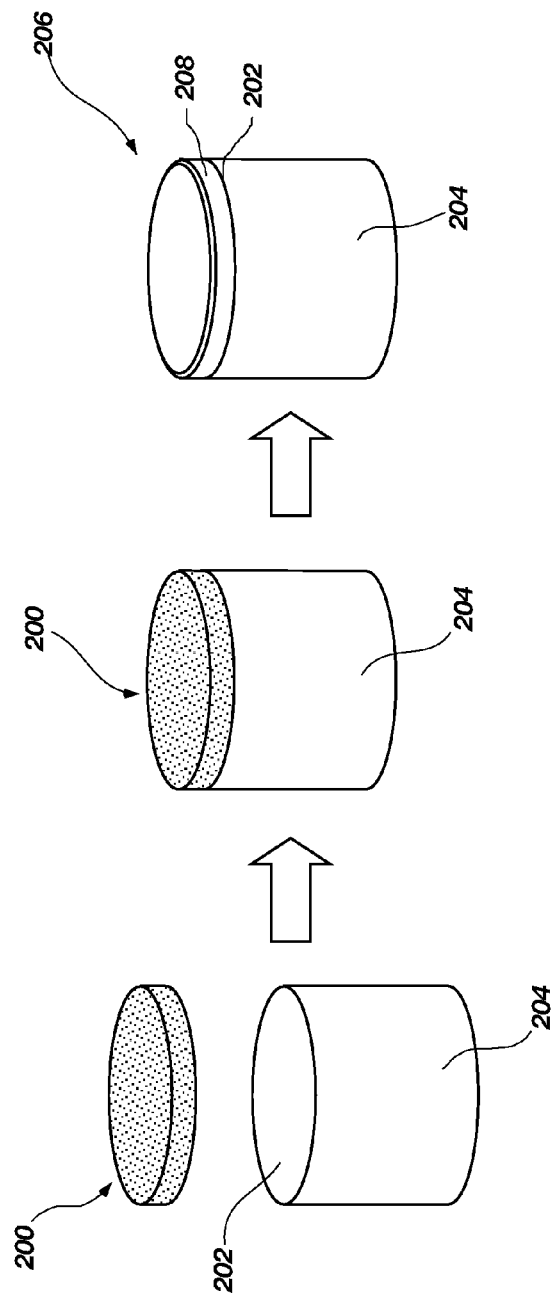
FIG. 2 is a schematic illustration of a method of fabricating a PDC according to an embodiment.

FIG. 2 is a schematic illustration of an embodiment of a method for fabricating a PDC. Referring to FIG. 2, a layer 200 comprising the mixture 108 that includes the diamond particles 100 and carbonate material 102 may be positioned adjacent to an interfacial surface 202 of a substrate 204. The substrate 204 may be generally cylindrical or another selected configuration, without limitation. Although the interfacial surface 202 is illustrated as being substantially planar, the interfacial surface 202 may exhibit a selected non-planar topography, without limitation. The substrate 204 may include a metal-solvent catalyst, such as cobalt in cobalt-cemented tungsten carbide. Other materials that may be used for the substrate 204 include, without limitation, cemented carbides including titanium carbide, niobium carbide, tantalum carbide, vanadium carbide, and combinations of any of the preceding carbides cemented with cobalt, iron, nickel, or alloys thereof. However, in some embodiments, the substrate 204 may be substantially free of any material that is capable of functioning as a catalyst for promoting growth of diamond. For example, the substrate 204 may be formed from a ceramic material or a cermet that does not include a metal-solvent catalyst.

Still referring to FIG. 2, the layer 200 and the substrate 204 may be subjected to a HPHT process using pressure and temperature conditions described above for forming the PCD 110. The PDC 206 so-formed includes a PCD table 208, at least a portion of which comprises PCD similar to or the same as the PCD embodiments described herein (e.g., the PCD 110), integrally formed with the substrate 204 and bonded to the interfacial surface 202 of the substrate 204.

Figure 3:
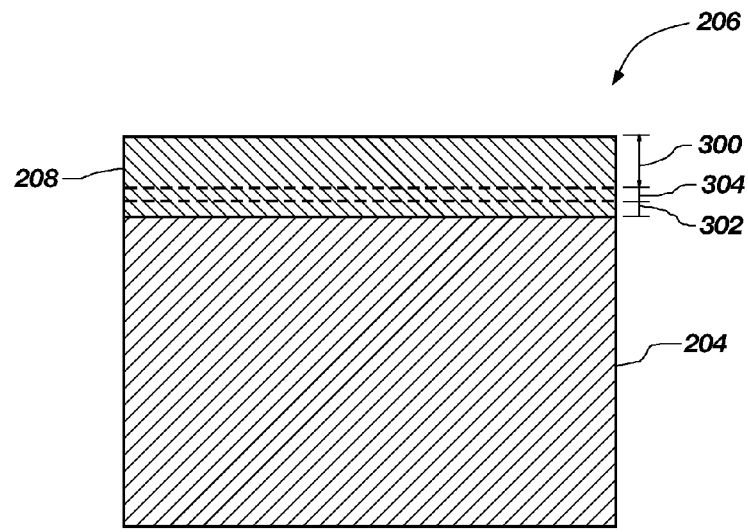
FIG. 3 is a cross-sectional view of the PDC formed according to the method shown in FIG. 2.

Referring to FIG. 3, the structure of the PCD table 208 is shown in more detail. In one embodiment, the HPHT process may be performed at a temperature sufficient to at least partially liquefy a constituent (i.e., an infiltrant) of the substrate 204 that infiltrates into the layer 200 comprising the mixture 108 and/or the PCD table 208. For example, the infiltrant may be a metal-solvent catalyst (e.g., cobalt) in a cemented carbide substrate. In such an embodiment, a first volume 300 of the PCD table 208 is remote from the substrate 204 and interstitial regions thereof may be occupied by an interstitial constituent comprising un-converted alkali metal carbonates, sintering by-products, or both. A second volume 302 of the PCD table 208 is at least proximate to the substrate 204 and interstitial regions thereof may be generally occupied by the infiltrant swept-in from the substrate 204. An intermediate volume 304 of the PCD table 208 is located between the first and second volumes 300 and 302 and interstitial regions thereof may be occupied by an interstitial constituent comprising un-converted metal carbonates, sintering by-products, infiltrant, or combinations of the foregoing.

In one embodiment, the HPHT process may be performed in two stages, with a first stage including heating the layer 200 comprising the mixture 108 and the substrate 204 to a first temperature sufficient to partially or completely melt the carbonate material 102 of the layer 200 and sinter the diamond particles 100, but not sufficient to liquefy a constituent of the substrate 204. After sintering the diamond particles 100 to form PCD table 208, the temperature may be increased to a second temperature sufficient to liquefy a constituent of the substrate 204 and infiltrate a portion of the PCD table 208 so that a strong metallurgical bond is formed between the substrate 204 and the PCD table 208.

In other embodiments, the temperature of the HPHT process may be sufficient to melt the carbonate material 102 of the layer 200 and a constituent of the substrate 204. In some embodiments, the diamond particles 100 may be sintered using the carbonate material 102 in the layer 108, while an infiltrant from the substrate 204 (e.g., a metal-solvent catalyst) infiltrates and also promotes diamond growth in a region adjacent to the substrate 204 during the same HPHT process.

In other embodiments, the PCD table 208 may be separately formed using a HPHT sintering process and, subsequently, bonded to the interfacial surface 202 of the substrate 204 by brazing, using a separate HPHT bonding process, or any other suitable joining technique, without limitation. In yet another embodiment, the substrate may be formed by depositing a binderless carbide (e.g., tungsten carbide) via chemical vapor deposition onto the separately formed PCD table. For example, U.S. Patent Application Publication US20080085407 is incorporated herein by this reference and discloses various techniques and embodiments relating to a binderless carbide on a PCD table.

Figure 4:
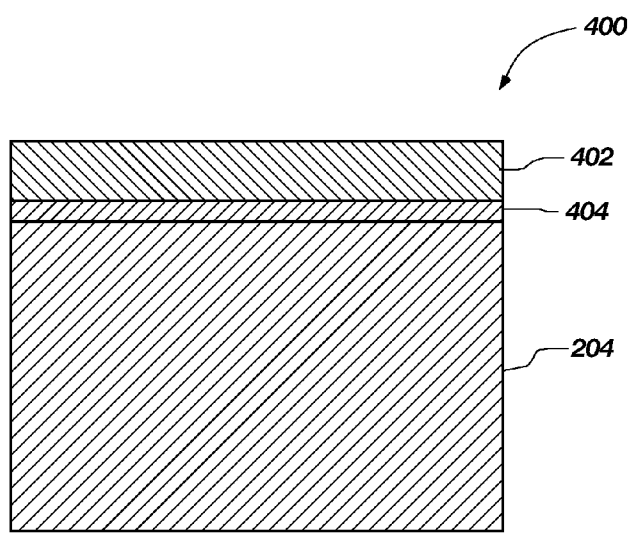
FIG. 4 is a cross-sectional view of an embodiment of a PDC including a PCD table bonded to a substrate with a refractory-metal layer.

Referring to FIG. 4, in an embodiment, a PDC 400 may be formed by bonding a PCD table 402 formed from the PCD 110 (FIG. 1) to the substrate 204 with a refractory-metal layer 404. For example, the refractory-metal layer 404 may be molybdenum, tungsten, zirconium, tantalum, or alloys of any of the preceding metals. In one embodiment, the PCD table 402 may be separately formed using a HPHT sintering process and subsequently bonded to the substrate 204 via the refractory-metal layer 404 in a separate HPHT process. In one embodiment, the separate HPHT process may be optionally performed at a temperature significantly higher than that used to form the PCD table 402. The refractory metal or metals of the refractory-metal layer 404 may infiltrate a portion of the interstitial regions of the PCD table 402 adjacent to the refractory-metal layer 404 to form a strong metallurgical bond with the PCD table 402.

Figure 5A:
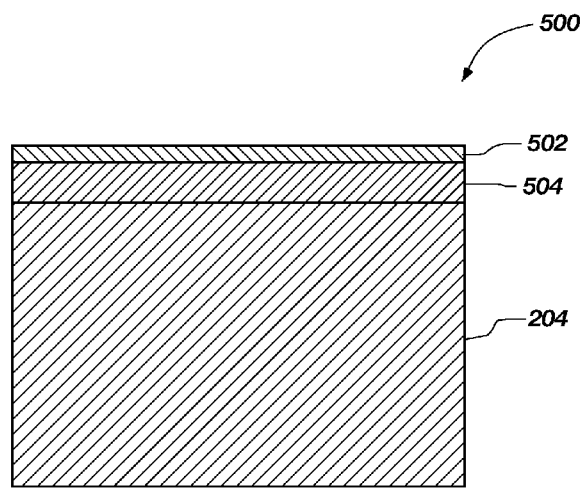
FIG. 5A is a cross-sectional view of an assembly to be HPHT processed according to an embodiment that includes a substrate, a layer of carbonate material, and a layer of diamond particles positioned therebetween.

FIG. 5A is a cross-sectional view of an assembly 500 to be HPHT processed according to an embodiment that includes a substrate 204, a layer of carbonate material 502, and a layer of diamond particles 504 positioned therebetween. The layer of carbonate material 502 may be formulated according to any of the previously disclosed embodiments for the carbonate material 102.

Figure 5B:
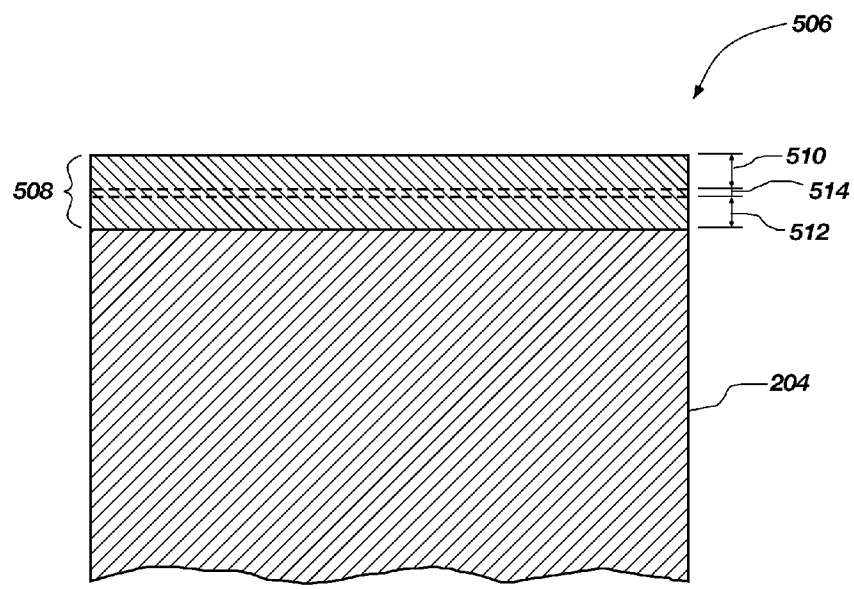
FIG. 5B is a cross-sectional view of the PDC formed after HPHT processing the assembly shown in FIG. 5A.

The assembly 500 may be subjected to a HPHT process using the same HPHT conditions previously discussed with respect to the PCD 110 (FIG. 1) to form a PDC 506 as shown in FIG. 5B. Referring to FIG. 5B, the PDC 506 includes a PCD table 508 having bonded diamond grains defining a plurality of interstitial regions. A first volume 510 of the PCD table 508 is remote from the substrate 204 and the interstitial regions thereof may be occupied by an interstitial constituent comprising un-converted metal carbonates, sintering by-products, or both. The amount of the carbonate material 502 in the assembly 500 may be chosen and the carbonate material 502 may infiltrate the layer 504 so that un-converted alkali metal carbonates of the carbonate material 502 and/or sintering by-products thereof occupy a selected volume of the PCD table 508. A second volume 512 of the PCD table 508 is at least proximate to the substrate 204 and the interstitial regions thereof may be generally occupied by the infiltrant swept-in from the substrate 204. An intermediate volume 514 of the PCD table 508 is located between the first and second volumes 510 and 512 and the interstitial regions thereof may be occupied by an interstitial constituent comprising un-converted alkali metal carbonates, sintering by-products, infiltrant, or combinations of the foregoing.

In one embodiment, the HPHT process may be performed in two stages, with a first stage including heating the assembly 500 to a first temperature sufficient to partially or completely melt the layer of carbonate material 502 to cause infiltration into the layer 504, but not sufficient to liquefy a constituent of the substrate 204. After infiltrating the diamond particles of the layer 504, the temperature may be increased to a second temperature sufficient to liquefy a constituent of the substrate 204 and infiltrate a portion of the PCD table 508 so that a strong metallurgical bond is formed between the substrate 204 and the PCD table 508. During one or both of the stages of the HPHT process, the PCD table 508 is formed by sintering the diamond particles of the layer 504.

In other embodiments, the temperature of the HPHT process may be sufficient to melt the layer of carbonate material 502 and a constituent of the substrate 204. In such an embodiment, the diamond particles of the layer 504 may be sintered using the carbonate material 502 that infiltrates into the layer 504, while an infiltrant from the substrate 204 (e.g., a metal-solvent catalyst) infiltrates into the layer 504 and also promotes diamond growth in a region adjacent to the substrate 204 during the same HPHT process.

In another embodiment, an assembly may be formed with the layer of carbonate material 502 disposed between the layer of diamond particles 504 and the substrate 204. Such an assembly may be subjected to the same or similar HPHT processing as the assembly 500 shown in FIG. 5A.

Figure 6A:
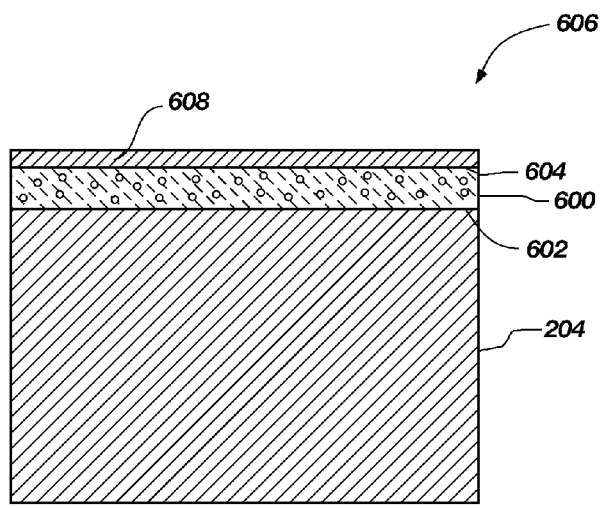
FIG. 6A is a cross-sectional view of an assembly for forming a PDC according to another embodiment in which a carbonate material infiltrates an at least partially leached PCD table so that at least a portion of the interstitial regions thereof may be filled with a thermally-stable interstitial constituent after HPHT processing.
Figure 6B:
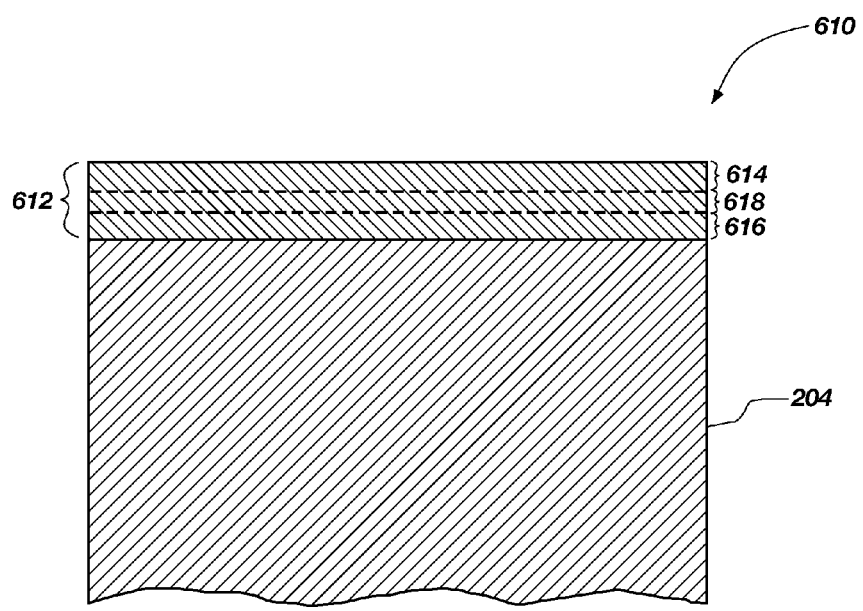
FIG. 6B is a partial cross-sectional view of the PDC formed after HPHT processing the assembly shown in FIG. 6A.

FIGS. 6A and 6B are cross-sectional views that illustrate another embodiment of a method for forming a PDC and the PDC so-formed in which a carbonate material infiltrates an at least partially leached PCD table so that at least a portion of the interstitial regions thereof may be filled with a thermally-stable interstitial constituent. Referring to FIG. 6A, an at least partially leached PCD table 600 (i.e., a porous, pre-sintered PCD table) may be provided. The at least partially leached PCD table 600 includes a plurality of interstitial regions that were previously occupied by a metal-solvent catalyst (e.g., iron, nickel, cobalt, or alloys thereof) and form a network of at least partially interconnected pores that extend between opposing surfaces 602 and 604 of the at least partially leached PCD table 600.

The at least partially leached PCD table 600 may be fabricated by subjecting a plurality of diamond particles (e.g., diamond particles having an average particle size between 0.5 μm to about 150 μm) to a HPHT sintering process in the presence of a metal-solvent catalyst, such as cobalt, nickel, iron, or alloys of any of the preceding metals to facilitate intergrowth between the diamond particles and form a PCD table comprising bonded diamond grains defining interstitial regions with the metal-solvent catalyst disposed within the interstitial regions. The as-sintered PCD table may be leached by immersion in an acid, such as aqua-regia, a solution of 90% nitric acid/10% de-ionized water, or subjected to another suitable process to remove at least a portion of the metal-solvent catalyst from the interstitial regions of the PCD table and form the at least partially leached PCD table 600. In one embodiment, the sintered diamond grains of the at least partially leached PCD table 600 may exhibit an average grain size of about 20 μm or less.

In some embodiments, the at least partially leached PCD table 600 may be cleaned to remove at least some of the leaching by-products disposed within at least some of the interstitial regions of the at least partially leached PCD table 600. The leaching by-products may comprise one or more types of residual salts, one or more types of oxides, combinations of the foregoing, or another leaching by-product. Such leaching by-products may reduce the thermal stability of the at least partially leached PCD table 600 and/or inhibit infiltrate with another material. U.S. patent application Ser. No. 12/120,849 ("the '849 Application") is incorporated herein in its entirety and discloses various cleaning techniques for removing leaching by-products from the at least partially leached PCD table 600. In some embodiments, in addition to cleaning, the surface 602 of the at least partially leached PCD table 600 may be substantially planarized as described in the '849 Application.

Still referring to FIG. 6A, an assembly 606 may be formed by placing the surface 602 of at least partially leached PCD table 600 adjacent to the substrate 204 and placing a layer 608 of carbonate material (e.g., the carbonate material 102) adjacent to the surface 604 of the at least partially leached PCD table 600. The assembly 606 may be subjected to an HPHT process using the same conditions previously described with respect to the PCD 110 (FIG. 1) during which the carbonate material of the layer 608 is liquefied and infiltrates the interstitial regions of the at least partially leached PCD table 600 and metal-solvent catalyst from the substrate 204 may be liquefied and infiltrate the at least partially leached PCD table 600 to form a strong metallurgical bond with the substrate 204. Additional diamond grains may be formed between existing diamond grains of the at least partially leached PCD table 600 due to carbon being provided from the carbonate material, carbon dissolved in the liquefied metal-solvent catalyst swept-in from the substrate 204, or both. For example, U.S. patent application Ser. No. 11/983,619 discloses infiltrating an at least partially leached PCD table with a silicon-containing material. Embodiments of the invention encompass HPHT processing assemblies disclosed in U.S. patent application Ser. No. 11/983,619 in which the silicon-containing material may replaced with a carbonate material, such as the carbonate material 102, to the at least partially leached PCD table.

FIG. 6B is a cross-sectional view of a PDC 610 formed by HPHT processing the assembly 606 shown in FIG. 6A. The PDC 610 includes a PCD table 612 bonded to the substrate 204. A first volume 614 of the PCD table 612 is remote from the substrate 204 and the interstitial regions thereof may be occupied by an interstitial constituent comprising un-converted alkali metal carbonates, non-stoichiometric alkali metal carbonates, alkali metal oxides, or combinations of the foregoing due to infiltration of the carbonate material of the layer 608. A second volume 616 of the PCD table 612 is at least proximate to the substrate 204 and the interstitial regions thereof may be generally occupied by the metal-solvent catalyst swept-in from the substrate 204. An intermediate volume 618 of the PCD table 612 is located between the first and second volumes 614 and 616 and the interstitial regions thereof may be occupied by an interstitial constituent comprising un-converted alkali metal carbonates, non-stoichiometric alkali metal carbonates, alkali metal oxides, metal-solvent catalyst, or combinations of the foregoing.

Despite the PCD table 612 being formed from the at least partially leached PCD table 600, a small indeterminate amount of metal-solvent catalyst may be present in the interstitial regions of the PCD table 612 that was not removed during the leaching process used to form the at least partially leached PCD table 600. For example, a small indeterminate amount of metal-solvent catalyst (e.g., cobalt) may be present in the interstitial regions of the first volume 614 that was not removed during the leaching process used to form the at least partially leached PCD table 600.

In an embodiment, the amount of the carbonate material in the layer 608 in the assembly 606 may be chosen so that un-converted alkali metal carbonates of the layer 608 of carbonate material, non-stoichiometric alkali metal carbonates, and/or alkali metal oxides, occupy a selected volume of the PCD table 612. For example, the first volume 614 of the interstitial regions may extend substantially the entire thickness of the PCD table 612, while the second volume 616 forms a small portion of the PCD table 612 that is sufficient to form a strong bond with the substrate 204.

In an embodiment, when un-converted alkali metal carbonates, non-stoichiometric alkali metal carbonates, or both are present in the PCD 610, the PCD 610 may be heat treated or otherwise chemically reacted (e.g., under at least a partial vacuum) and at a temperature sufficient to convert substantially all of the remaining alkali metal carbonates to corresponding alkali metal oxides.

In yet another embodiment, a carbonate material (e.g., the carbonate material 102) may infiltrate an at least partially leached PCD table that is already attached to a substrate. For example, a PDC having a substrate and a PCD table bonded thereto may be provided. The PCD table may be leached to a selected depth to deplete metal-solvent catalyst from the PCD table that was used to integrally form the PCD table with the substrate. Then, a carbonate material (e.g., the carbonate material 102) may be infiltrated into the at least partially leached PCD table. Optionally, the carbonate material may infiltrate the PCD table in a second HPHT process.

Figure 10:
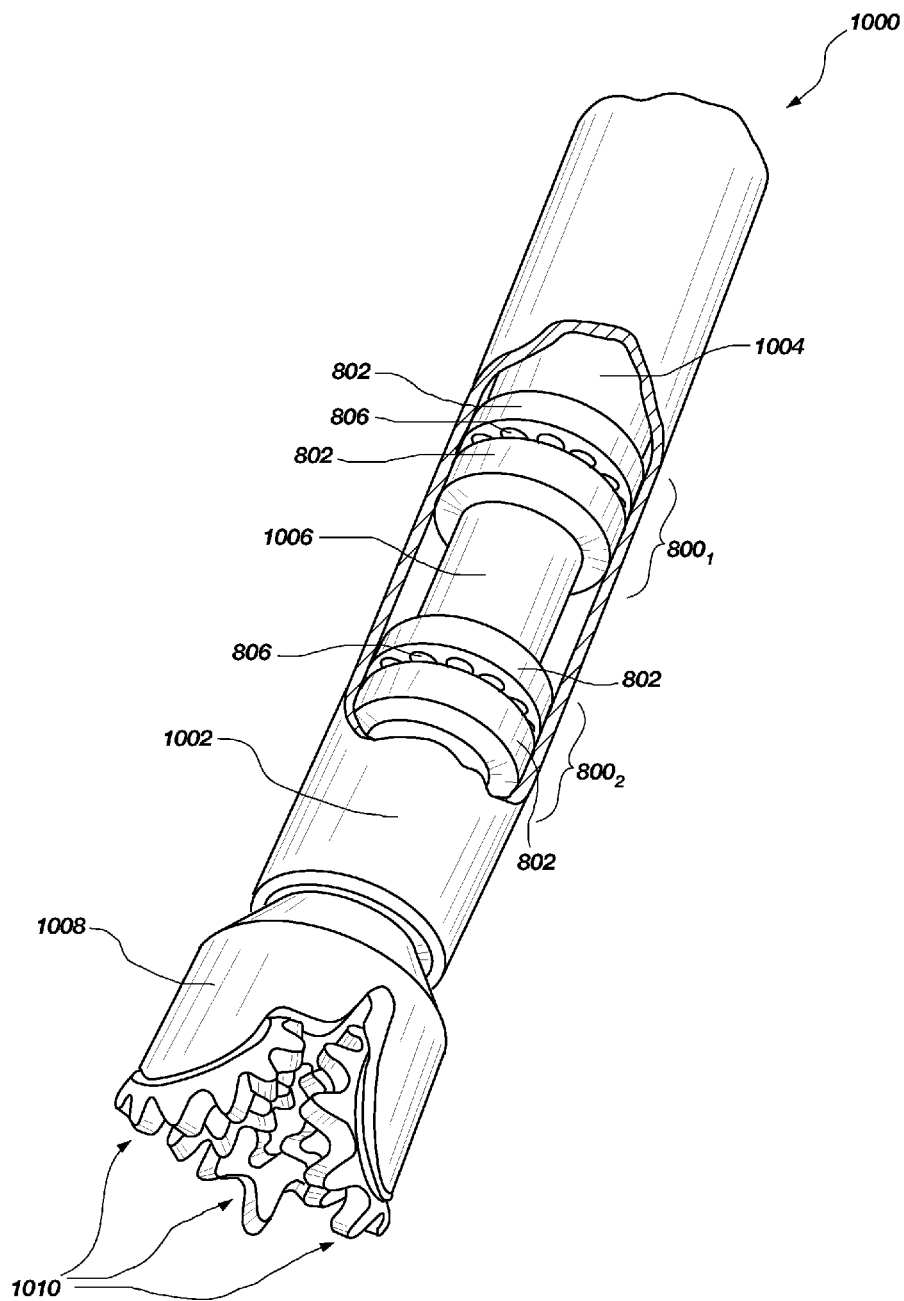
FIG. 10 is a schematic isometric cut-away view of an embodiment of a subterranean drilling system including the thrust-bearing apparatus shown in FIG. 8.
Figure 11:
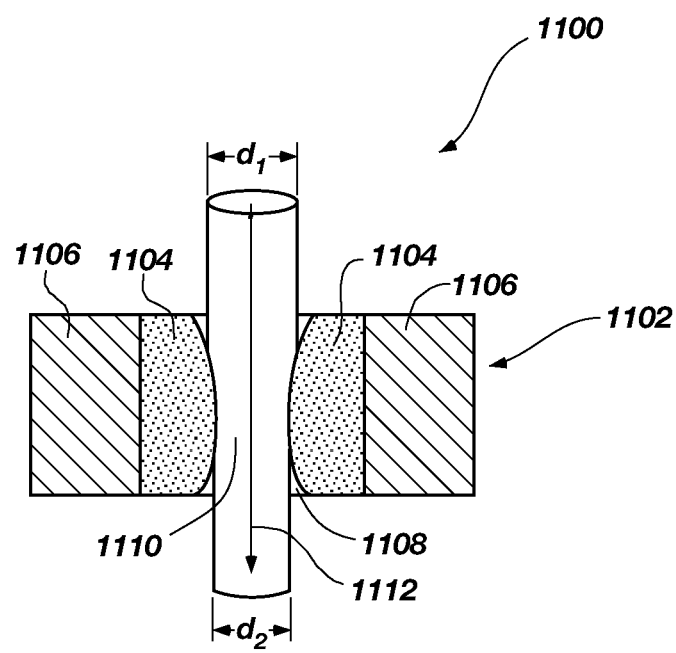
FIG. 11 is a side cross-sectional view of an embodiment of a wire-drawing die that employs a PDC fabricated in accordance with the teachings described herein.

The disclosed embodiments of PDCs and PCD may be used in a number of different applications including, but not limited to, use in a rotary drill bit (FIGS. 7A and 7B), a thrust-bearing apparatus (FIG. 8), a radial bearing apparatus (FIG. 9), a subterranean drilling system (FIG. 10), and a wire-drawing die (FIG. 11). It should be emphasized that the various applications discussed above are merely some examples of applications in which the PDC and PCD embodiments may be used. Other applications are contemplated, such as employing the disclosed PDC and PCD embodiments in friction stir welding tools.

Figure 7A:
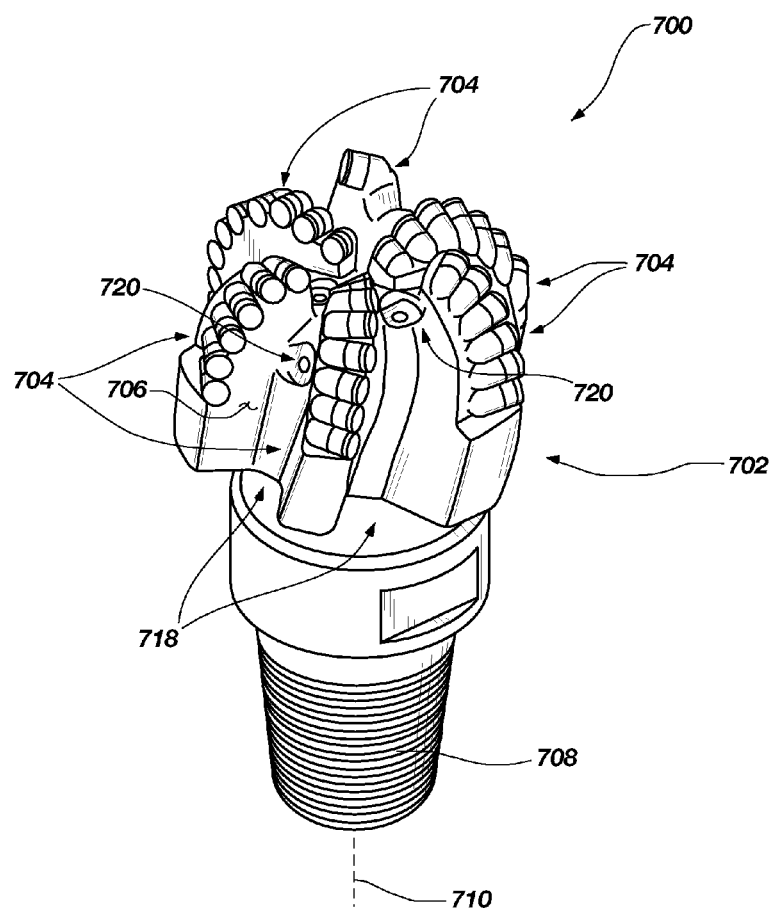
FIG. 7A is an isometric view of an embodiment of a rotary drill bit that may employ one or more of the disclosed PDC embodiments.
Figure 7B:
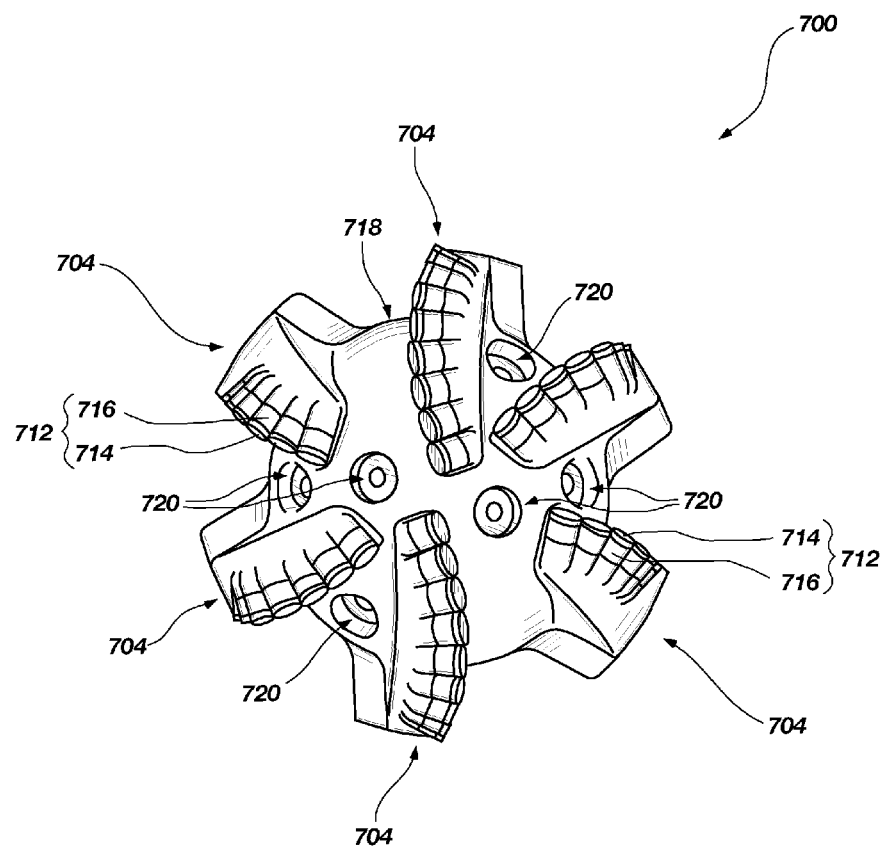
FIG. 7B is a top elevation view of the rotary drill bit shown in FIG. 7A.

FIG. 7A is an isometric view and FIG. 7B is a top elevation view of an embodiment of a rotary drill bit 700. The rotary drill bit 700 includes at least one PDC configured according to any of the previously described PDC embodiments. The rotary drill bit 700 comprises a bit body 702 that includes radially and longitudinally extending blades 704 with leading faces 706, and a threaded pin connection 708 for connecting the bit body 702 to a drilling string. The bit body 702 defines a leading end structure for drilling into a subterranean formation by rotation about a longitudinal axis 710 and application of weight-on-bit. At least one PDC cutting element, configured according to any of the previously described PDC embodiments (e.g., the PDC 206 shown in FIG. 2), may be affixed to rotary drill bit 700. With reference to FIG. 7B, a plurality of PDCs 712 are secured to the blades 704. For example, each PDC 712 may include a PCD table 714 bonded to a substrate 716. More generally, the PDCs 712 may comprise any PDC disclosed herein, without limitation. In addition, if desired, in some embodiments, a number of the PDCs 712 may be conventional in construction. Also, circumferentially adjacent blades 704 define so-called junk slots 718 therebetween, as known in the art. Additionally, the rotary drill bit 700 may include a plurality of nozzle cavities 720 for communicating drilling fluid from the interior of the rotary drill bit 700 to the PDCs 712.

FIGS. 7A and 7B merely depict one embodiment of a rotary drill bit that employs at least one cutting element that comprises a PDC fabricated and structured in accordance with the disclosed embodiments, without limitation. The rotary drill bit 700 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PCD and/or PDCs disclosed herein (e.g., the PDC 200 shown in FIG. 2) may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 8:
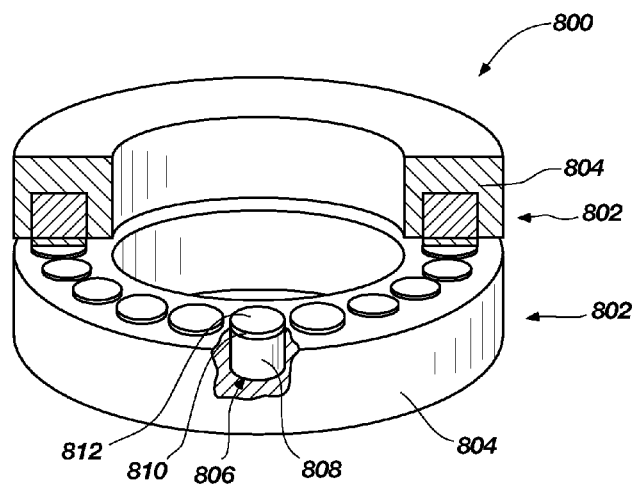
FIG. 8 is an isometric cut-away view of an embodiment of a thrust-bearing apparatus, which may utilize any of the disclosed PDC embodiments as bearing elements.

FIG. 8 is an isometric cut-away view of an embodiment of a thrust-bearing apparatus 800, which may utilize any of the disclosed PDC embodiments as bearing elements. The thrust-bearing apparatus 800 includes respective thrust-bearing assemblies 802. Each thrust-bearing assembly 802 includes an annular support ring 804 that may be fabricated from a material, such as carbon steel, stainless steel, or another suitable material. Each support ring 804 includes a plurality of recesses (not labeled) that receives a corresponding bearing element 806. Each bearing element 806 may be mounted to a corresponding support ring 804 within a corresponding recess by brazing, press-fitting, using fasteners, or another suitable mounting technique. One or more, or all of bearing elements 806 may be configured according to any of the disclosed PDC embodiments. For example, each bearing element 806 may include a substrate 808 and a PCD table 810, with the PCD table 810 including a bearing surface 812.

In use, the bearing surfaces 812 of one of the thrust-bearing assemblies 802 bears against the opposing bearing surfaces 812 of the other one of the bearing assemblies 802. For example, one of the thrust-bearing assemblies 802 may be operably coupled to a shaft to rotate therewith and may be termed a "rotor." The other one of the thrust-bearing assemblies 802 may be held stationary and may be termed a "stator."

Figure 9:
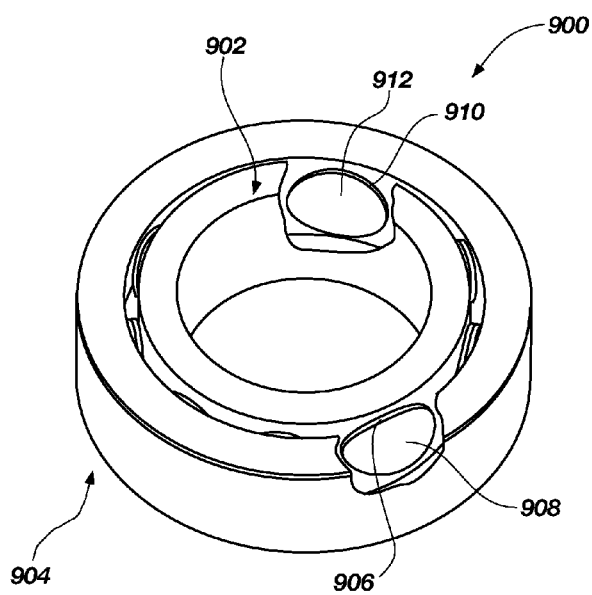
FIG. 9 is an isometric cut-away view of an embodiment of a radial bearing apparatus, which may utilize any of the disclosed PDC embodiments as bearing elements.

FIG. 9 is an isometric cut-away view of an embodiment of a radial bearing apparatus 900, which may utilize any of the disclosed PDC embodiments as bearing elements. The radial bearing apparatus 900 includes an inner race 902 positioned generally within an outer race 904. The outer race 904 includes a plurality of bearing elements 906 affixed thereto that have respective bearing surfaces 908. The inner race 902 also includes a plurality of bearing elements 910 affixed thereto that have respective bearing surfaces 912. One or more, or all of the bearing elements 906 and 910 may be configured according to any of the PDC embodiments disclosed herein. The inner race 902 is positioned generally within the outer race 904 and, thus, the inner race 902 and outer race 904 may be configured so that the bearing surfaces 908 and 912 may at least partially contact one another and move relative to each other as the inner race 902 and outer race 904 rotate relative to each other during use.

The radial-bearing apparatus 900 may be employed in a variety of mechanical applications. For example, so-called "roller cone" rotary drill bits may benefit from a radial-bearing apparatus disclosed herein. More specifically, the inner race 902 may be mounted or affixed to a spindle of a roller cone and the outer race 904 may be affixed to an inner bore formed within a cone and that such an outer race 904 and inner race 902 may be assembled to form a radial-bearing apparatus.

Referring to FIG. 10, the thrust-bearing apparatus 800 and/or radial bearing apparatus 900 may be incorporated in a subterranean drilling system. FIG. 10 is a schematic isometric cut-away view of a subterranean drilling system 1000 that includes at least one of the thrust-bearing apparatuses 800 shown in FIG. 8 according to another embodiment. The subterranean drilling system 1000 includes a housing 1002 enclosing a downhole drilling motor 1004 (i.e., a motor, turbine, or any other device capable of rotating an output shaft) that is operably connected to an output shaft 1006. A first thrust-bearing apparatus $800_1$ (FIG. 8) is operably coupled to the downhole drilling motor 1004. A second thrust-bearing apparatuses $800_2$ (FIG. 8) is operably coupled to the output shaft 1006. A rotary drill bit 1008 configured to engage a subterranean formation and drill a borehole is connected to the output shaft 1006. The rotary drill bit 1008 is shown as a roller cone bit including a plurality of roller cones 1010. However, other embodiments may utilize different types of rotary drill bits, such as a so-called "fixed cutter" drill bit shown in FIGS. 7A and 7B. As the borehole is drilled, pipe sections may be connected to the subterranean drilling system 1000 to form a drill string capable of progressively drilling the borehole to a greater depth within the earth.

A first one of the thrust-bearing assemblies 802 of the thrust-bearing apparatus $800_1$ is configured as a stator that does not rotate and a second one of the thrust-bearing assemblies 802 of the thrust-bearing apparatus $800_1$ is configured as a rotor that is attached to the output shaft 1006 and rotates with the output shaft 1006. The on-bottom thrust generated when the drill bit 1008 engages the bottom of the borehole may be carried, at least in part, by the first thrust-bearing apparatus $800_1$. A first one of the thrust-bearing assemblies 802 of the thrust-bearing apparatus $800_2$ is configured as a stator that does not rotate and a second one of the thrust-bearing assemblies 802 of the thrust-bearing apparatus $800_2$ is configured as a rotor that is attached to the output shaft 1006 and rotates with the output shaft 1006. Fluid flow through the power section of the downhole drilling motor 1004 may cause what is commonly referred to as "off-bottom thrust," which may be carried, at least in part, by the second thrust-bearing apparatus $800_2$.

In operation, drilling fluid may be circulated through the downhole drilling motor 1004 to generate torque and effect rotation of the output shaft 1006 and the rotary drill bit 1008 attached thereto so that a borehole may be drilled. A portion of the drilling fluid may also be used to lubricate opposing bearing surfaces of the bearing elements 806 of the thrust-bearing assemblies 802.

FIG. 11 is a side cross-sectional view of an embodiment of a wire-drawing die 1100 that employs a PDC 1102 fabricated in accordance with the teachings described herein. The PDC 1102 includes an inner, annular PCD region 1104 comprising any of the PCD tables described herein that is bonded to an outer cylindrical substrate 1106 that may be made from the same materials as the substrate 102 shown in FIG. 1. The PCD region 1104 also includes a die cavity 1108 formed therethrough configured for receiving and shaping a wire being drawn. The wire-drawing die 1100 may be encased in a housing (e.g., a stainless steel housing), which is not shown, to allow for handling.

In use, a wire 1110 of a diameter $d_1$ is drawn through die cavity 1108 along a wire drawing axis 1112 to reduce the diameter of the wire 1110 to a reduced diameter $d_2$.

Although description above is directed to forming PCD and PDCs, in other embodiments, so-called diamond grit may be formed. Diamond grit may be formed that is substantially free of metal-solvent catalyst. In one embodiment, graphite particles may be sintered using the HPHT conditions described above (e.g., about 1100° Celsius to about 1300° Celsius and a pressure of about 70 kilobar to about 80 kilobar) in the presence of any of the disclosed carbonate materials to convert at least a portion of the graphite particles to diamond particles. Because the diamond particles are not formed in the presence of a metal-solvent catalyst (e.g., cobalt, iron, nickel, or alloys thereof), the diamond particles may be substantially free of metal-solvent catalyst. Consequently, the diamond particles so-formed may exhibit a higher thermal stability than diamond particles formed in the presence of a metal-solvent catalyst. For example, graphite particles may be mixed with the carbonate material 102 (FIG. 1) and subjected to a HPHT process.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises") and mean "including, but not limited to."

The invention claimed is:

1. A method of fabricating a polycrystalline diamond compact, comprising:
    assembling a plurality of diamond particles with a substrate; and
    sintering at least a portion of the plurality of diamond particles with a carbonate material at a temperature at or near a eutectic temperature of the carbonate material to form at least a portion of a polycrystalline diamond table of the polycrystalline diamond compact, wherein the carbonate material comprises at least one alkali metal carbonate and at least one melting point depressant in proportions at or near a eutectic composition for a chemical system of the at least one alkali metal carbonate and the at least one melting point depressant.

2. The method of claim 1 wherein the at least one melting point depressant comprises at least a second alkali metal carbonate.

3. The method of claim 1
    further comprising selecting the at least one alkali metal carbonate to be a first alkali metal carbonate and the at least one melting point depressant to include at least a second alkali metal carbonate.

4. The method of claim 1
    further comprising selecting the at least one alkali metal carbonate to be lithium carbonate and the at least one melting point depressant to include sodium carbonate and potassium carbonate.

5. The method of claim 1:
wherein sintering at least a portion of the plurality diamond particles with a carbonate material to form at least a portion of a polycrystalline diamond table of the polycrystalline diamond compact comprises sintering the at least a portion of the plurality of diamond particles at a first temperature to form the at least a portion of the polycrystalline diamond table;
further comprising heating the at least a portion of the polycrystalline diamond table and the substrate at a second temperature that is greater than that of the first temperature.

6. The method of claim 5 wherein heating the polycrystalline diamond table and the substrate at a second temperature that is greater than that of the first temperature effects infiltrating a portion of the polycrystalline diamond table with a constituent from the substrate.

7. The method of claim 1, further comprising converting at least a portion of the carbonate material during the act of sintering to at least one sintering by-product including at least one of the following: an alkali metal oxide or a non-stoichiometric alkali metal carbonate.

8. The method of claim 1, further comprising, prior to the act of sintering, mixing, with the plurality of diamond particles, first particles comprising the at least one alkali metal carbonate and second particles comprising the at least one melting point depressant.

9. The method of claim 1, further comprising, prior to the act of sintering, positioning a first layer comprising the carbonate material adjacent to a second layer comprising the plurality of diamond particles.

10. The method of claim 1 wherein sintering at least a portion of the plurality of diamond particles with a carbonate material to form at least a portion of a polycrystalline diamond table of the polycrystalline diamond compact comprises subjecting the plurality of diamond particles and the carbonate material to a temperature below about 2250° Celsius and a pressure below about 80 kilobar.

11. A method of forming a polycrystalline diamond compact, comprising:

providing an at least partially leached polycrystalline diamond table including a plurality of interstitial regions; and after the act of providing the at least partially leached polycrystalline diamond table, infiltrating at least a portion of the interstitial regions of the at least partially leached polycrystalline diamond table with a carbonate material.

12. The method of claim 11 wherein providing an at least partially leached polycrystalline diamond table including a plurality of interstitial regions comprises disposing the at least partially leached polycrystalline diamond table between a substrate and a layer of the carbonate material.

13. The method of claim 11 wherein the carbonate material comprises at least alkali metal carbonate.

14. The method of claim 1 wherein sintering at least a portion of the plurality of diamond particles in the presence of a carbonate material to form at least a portion of a polycrystalline diamond table of the polycrystalline diamond compact effects infiltration of a metal-solvent catalyst from the substrate into a portion of the plurality of diamond particles adjacent to the substrate.

15. The method of claim 11 wherein the carbonate material comprises two or more alkali metal carbonates in proportions at or near a eutectic composition for a chemical system of the two or more alkali metal carbonates.

16. The method of claim 11, further comprising attaching a cemented carbide substrate to the at least partially leached polycrystalline diamond table.

17. The method of claim 11 wherein the at least partially leached polycrystalline diamond table is disposed between a layer of the carbonate material and a substrate.

18. The method of claim 11 wherein the at least partially leached polycrystalline diamond table is disposed adjacent to a layer of the carbonate material and a substrate.

19. The method of claim 11 wherein the at least partially leached polycrystalline diamond table is attached to a substrate prior to the act of infiltrating.

* * * * *